US009406188B2

(12) United States Patent
Erickson

(10) Patent No.: US 9,406,188 B2
(45) Date of Patent: Aug. 2, 2016

(54) COMMUNICATION CONTROL FOR PROGRESSIVE GAME CONTROLLER TO PREVENT NEAR-CONCURRENT WINS

(75) Inventor: Robert Peter Erickson, River Glade (CA)

(73) Assignee: GTECH CANADA ULC, Moncton, New Brunswick (CA)

( * ) Notice: Subject to any disclaimer, the term of this patent is extended or adjusted under 35 U.S.C. 154(b) by 1572 days.

(21) Appl. No.: 11/242,720

(22) Filed: Oct. 3, 2005

(65) Prior Publication Data

US 2006/0079320 A1 Apr. 13, 2006

Related U.S. Application Data

(60) Provisional application No. 60/615,456, filed on Oct. 1, 2004.

(51) Int. Cl.
*G06F 17/00* (2006.01)
*G06F 19/00* (2011.01)
*G07F 17/32* (2006.01)

(52) U.S. Cl.
CPC ............ *G07F 17/32* (2013.01); *G07F 17/3258* (2013.01); *G07F 17/3269* (2013.01)

(58) Field of Classification Search
CPC ......................... G07F 17/3258; G07F 17/3269
USPC ................................................ 463/25–27, 42
See application file for complete search history.

(56) References Cited

U.S. PATENT DOCUMENTS 4,837,728 A * 6/1989 Barrie et al. .................... 463/27
5,249,800 A * 10/1993 Hilgendorf et al. ............. 463/27
5,393,061 A 2/1995 Manship et al.
5,611,730 A * 3/1997 Weiss ...................... G07F 17/32 463/20
5,645,486 A 7/1997 Nagao et al.
5,697,843 A 12/1997 Manship et al.
6,146,273 A 11/2000 Olsen
6,319,125 B1 * 11/2001 Acres .............................. 463/25
6,790,143 B2 * 9/2004 Crumby .......................... 463/42
6,884,174 B2 * 4/2005 Lundy et al. .................... 463/42
6,887,154 B1 * 5/2005 Luciano et al. ................. 463/26
7,255,645 B2 * 8/2007 Steil et al. ....................... 463/27
2002/0123376 A1 * 9/2002 Walker et al. ................... 463/11
2003/0114217 A1 * 6/2003 Walker .................... G07F 17/32 463/20
2003/0148808 A1 * 8/2003 Price ....................... G07F 17/32 463/27
2004/0058727 A1 * 3/2004 Marks ................ G07F 17/3211 463/20
2004/0077403 A1 * 4/2004 Maya ...................... G07F 17/32 463/20
2005/0026691 A1 * 2/2005 Mathis ............................ 463/42
2005/0090305 A1 * 4/2005 Silva ....................... G07F 17/32 463/16
2005/0239530 A1 * 10/2005 Walker et al. ................... 463/16
2006/0100009 A1 * 5/2006 Walker et al. ................... 463/25
2006/0217174 A1 * 9/2006 Walker et al. ................... 463/16
2007/0054722 A1 * 3/2007 De Bruin et al. ............... 463/16

* cited by examiner

*Primary Examiner* — Steven J Hylinski
(74) *Attorney, Agent, or Firm* — Sullivan & Worcester LLP

(57) ABSTRACT

Methods and apparatus for preventing near-concurrent wins in a progressive gaming system controlled by Jackpot Controller are disclosed. A VLT player may send a "win" combination to the Jackpot Controller to determine whether the "win" awards the accumulating progressive jackpot. The Jackpot Controller may evaluate the "win" message. If the "win" message is valid, the "win" of the accumulating progressive jackpot may be confirmed. Other VLTs may be blocked from submitting "win" messages for that same progressive jackpot. The VLT may then distribute the proceeds to the player. The Jackpot Controller may initiate other progressive jackpot status communications to insure against a loss of data should an interruption event occur. Individual VLTs may initiate status messages to the Jackpot Controller should they remain inactive for a predetermined period.

22 Claims, 7 Drawing Sheets

COMMUNICATION CONTROL FOR PROGRESSIVE GAME CONTROLLER TO PREVENT NEAR-CONCURRENT WINS

RELATED APPLICATION AND PRIORITY CLAIM

This application claims priority under 35 U.S.C. 119 to U.S. provisional application 60/615,456 filed Oct. 1, 2004. The entire contents of the referenced application is incorporated herein by reference thereto.

BACKGROUND

Casino gaming is a sizable component of the entertainment industry in the United States. In 2002, there were 432 commercial (i.e., nongovernmental) casinos, with a combined revenue of more than $26 billion. In recent years, casinos have adopted the use of a computerized machine, often referred to as a video lottery terminal ("VLT"). Video lottery terminals are well known in the art, as exemplified by U.S. Pat. Nos. 5,393,061 and 5,697,843 (both to Manship et al.). Unlike a conventional gaming machine that is mechanical in nature and pays out in negotiable currency in the event a winning combination of game elements is displayed, a VLT machine is microprocessor-based and pays out either in the form of credits (that can be redeemed for money) accumulated in the machine or in physical coins or tokens.

In many instances, VLTs are incorporated into a networked progressive gaming system in which multiple VLTs are connected to a central controller ("Jackpot Controller") to increase play by providing a chance to win a progressive jackpot award. A progressive jackpot is a jackpot that increases in amount by taking a percentage of each bet played from each VLT connected to the system and adding it to the jackpot amount. Typically, this incrementing jackpot amount is advertised on an overhead sign or on the VLT display, to induce players to play. In many cases, the amount displayed is less than the actual jackpot amount so a rolling effect may be produced on the advertising display. When a player wins the jackpot, the actual jackpot amount is paid to the player, and the venue hosting the game will reseed the jackpot with a starting amount and restart the progressive accumulation.

Progressive gaming systems are well known in the art. For example, U.S. Pat. No. 4,837,728 (Barrie et al.), titled "Multiple Progressive Gaming System that Freezes Payouts at Start of Game", discloses a gaming system in which the Jackpot Controller resets non-winning VLTs to a beginning amount when a win is registered by another VLT, preventing non-winning VLTs from awarding the claimed jackpot amount. However, other VLTs that are in play at the time the win is registered still play at the higher non-reset jackpot amount.

U.S. Pat. No. 5,645,486 (Nagao et al.), titled "Gaming System that Pays Out a Progressive Bonus Using a Lottery", discloses a progressive jackpot payout on a lottery system, such that when a player hits a winning combination the player may win the progressive jackpot if the winning instance matches the predetermined lottery instance.

U.S. Pat. No. 6,146,273 (Olsen), titled "Progressive Jackpot Gaming System with Secret Bonus Pool", discloses a progressive game with a bonus mode which creates a time window in which all eligible machines may play for random bonus jackpots. Each award decrements the current value of the bonus pool until the bonus pool reaches zero.

BRIEF DESCRIPTION OF THE DRAWINGS

FIG. 4-1 is a flowchart illustrating an example messaging interaction and processing between a winning VLT, the Jackpot Controller, and the other VLTs, according to an example embodiment of the present invention.

FIG. 4-2 illustrates example fields contained in the example message sent from the VLT to the Jackpot Controller to inform the Jackpot Controller a win will occur, according to an example embodiment of the present invention.

FIG. 4-3 illustrates example fields contained in the example message sent from the Jackpot Controller to the VLT to communicate the actual amount of the jackpot to be awarded by the ensuing play, according to an example embodiment of the present invention.

FIG. 4-4 illustrates example fields contained in the example message sent from the winning VLT to the Jackpot Controller to confirm the jackpot amount, according to an example embodiment of the present invention.

FIG. 4-5 illustrates example field contained in the example message sent from the winning VLT to the Jackpot Controller after displaying the winning jackpot combination, according to an example embodiment of the present invention.

FIG. 5 is a flowchart illustrating the example message communication and resultant course of action between an individual VLT and the Jackpot Controller should a VLT malfunction occur, according to an example embodiment of the present invention.

FIG. 6-1 depicts example fields contained in the example broadcast message sent from the Jackpot Controller to all connected VLTs, according to an example embodiment of the present invention.

DETAILED DESCRIPTION OF EXAMPLE EMBODIMENTS

Figure 1:
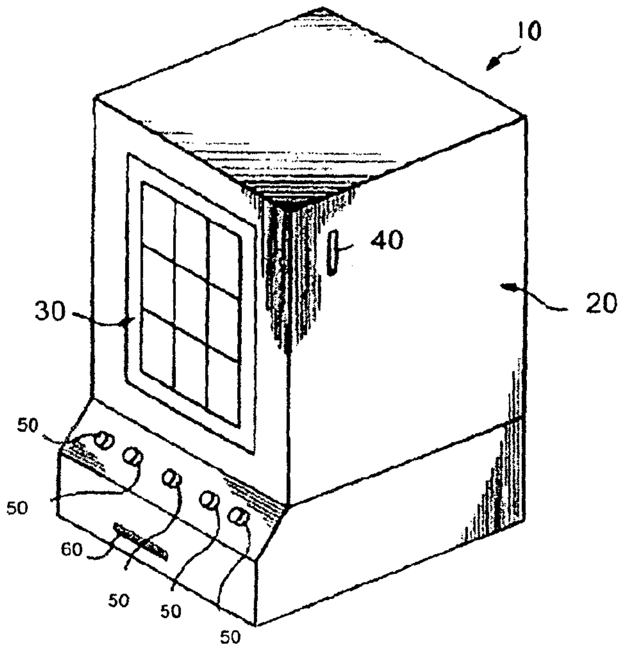
FIGURE 1 PRIOR ART
FIG. 1 is a perspective view of a video gaming machine, known as a VLT.

Some example embodiments of the present invention are related to gaming devices. More specifically, some example embodiments of the present invention relate to progressive gaming systems employing a plurality of video lottery terminals.

There is a need in the art to address the situation where multiple VLTs are concurrently active. Specifically, between the time a player executes a play on the machine and the result is displayed, approximately three seconds elapse (spin time). The Jackpot Controller resets all non-active VLTs to the predetermined beginning jackpot amount when the win is communicated at the conclusion of the spin. The VLT communicates a win upon the conclusion of the spin. However, during the spin time, another VLT could initiate a play. However, active VLTs, at the time the win is received by the Jackpot Controller from the winning VLT, are not reset. Those active VLTs complete their current game applying the progressive win amounts that have already been won. Hence, should the active VLT also win, two payouts will be required to be made at the progressive amount while the venue's collections only support a single progressive payout. Should a freeze or reset be enacted upon an active VLT before it completes its play, the progressive win amounts for which the player is playing would change, thereby potentially causing player confusion or even player anger.

Another deficiency in the art is a lack of safeguards to prevent data loss from the Jackpot Controller. In the event of some interruption that affects the memory of the Jackpot Controller, the potential exists that the Jackpot Controller would no longer have the proper progressive jackpot amount stored. Consequently, the Jackpot Controller could not display the jackpot amount on either an advertising sign or on the VLT screens, nor could the Jackpot Controller communicate the correct progressive amount when a VLT communicates a win.

Another deficiency in the art is a lack of VLT monitoring by the Jackpot Controller to prevent non-functioning VLTs from operating. In the event the connection between a VLT and the Jackpot Controller is interrupted, a subsequent play initiated on the malfunctioning VLT would not compete for the jackpot. This interruption is not apparent to the player at that VLT, and that player may continue to use that VLT after the interruption occurs. Subsequent plays may result in apparent wins, possibly for the jackpot, but no payout would occur, likely angering the player or causing player confusion.

There is a need for a system and method of communication between a Jackpot Controller and a plurality of connected VLTs that prevents other VLTs from registering a jackpot win for the same jackpot that a different VLT has previously registered to win, but has yet to be disclosed to the player. In addition, such a system and method of communication may also monitor the connection of individual VLT machines to ensure each VLT is connected to the system, and preventing play should an interruption of that connection occur. In addition, in the event an interruption in the network connection occurs that jeopardizes the data stored by the Jackpot Controller, such communications may ensure that the jackpot amount prior to the network interruption is retained such that the Jackpot Controller may resume the progressive game following the interruption event.

Some example embodiments of the present invention decrease the event of near-concurrent wins of a progressive jackpot through message communications sent between a winning VLT, a Jackpot Controller, and a plurality of other connected VLTS, whereby a registered win initiates a sequence which locks other VLTs from play for the progressive jackpot amount, and then resets the other VLTs to play for a new progressive jackpot amount.

Some example embodiments of the present invention provide a Jackpot Controller monitoring function, whereby individual VLTs send status messages at predetermined configurable intervals to the Jackpot Controller, and in the event the Jackpot Controller does not receive a status messages from a VLT, the Jackpot Controller initiates a procedure to disconnect the VLT from the progressive game network.

Some example embodiments of the present invention incorporate an interruption recovery mechanism whereby upon the occurrence of an interruption event, the Jackpot Controller initiates a recover process to obtain progressive jackpot amount data from the VLTs, stored by the VLTs from broadcast messages periodically sent by the Jackpot Controller.

Some example embodiments of the present invention establish a communication protocol, which deals with the near-concurrent win situation, thus avoiding any possibility or pressure on a casino to pay jackpots more often than necessary. In summary, the individual VLT, once credits are received, will communicate the upcoming outcome to the central controller or jackpot controller. This jackpot controller can then determine if the jackpot amount is won and provide appropriate lockouts to all other VLTs. Once play of the individual VLT has commenced (i.e., the spinning starts), the central system is already aware that the machine will achieve a winning outcome, and has communicated this back to the VLT as a confirmation. Further, the jackpot controller blocks other VLTs from registering wins in a like manner. Consequently, any message sent back to subsequent winners will clearly identify the lower jackpot amount that is being played for at that point in time.

In this continuing communication with the jackpot controller, constant updates may be received so that the jackpot controller can maintain a history of the VLT status. By maintaining this history, the ability to perform interrupt recover is provided by the jackpot controller. This interrupt recovery possibility could then be used should the VLTs ever have operation difficulties.

Video Lottery Terminals ("VLTs")

FIG. 1 provides a perspective view of an example video gaming machine 10. For example, U.S. Pat. Nos. 5,393,061 and 5,697,843 (both to Manship et al.) describe various aspects of a video gaming machine and are incorporated herein by reference. For the purposes of this description, a video gaming machine is interchangeably referred to as a video lottery terminal, a VLT, a terminal, a machine, and other similar descriptive labels.

The VLT machine 10 may include a housing 20 having a display screen 30, and a money receptacle 40 for the depositing of coins, bills, tokens, etc. The VLT 10 may also have a series of buttons 50. Each of these buttons may be used for a particular feature of the game. For example, one button 50 may be used to place a bet while another button 50 may be used to spin the reels of the game. Alternatively, the buttons may be multipurpose and the player will be prompted by messages on the screen. A payout device 60 may be used to release a certain number of quarters, tokens, etc. when a winning game is played.

Figure 2:
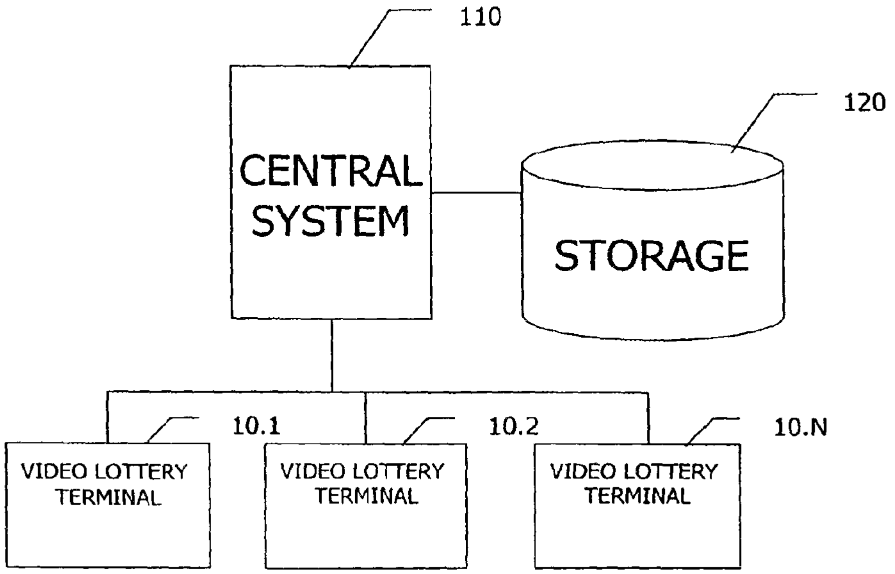
FIGURE 2 PRIOR ART
FIG. 2 is a block diagram illustrating an example progressive gaming system made up of several video gaming machines, according to an example embodiment of the present invention.

FIG. 2 is a simplified block diagram of an example progressive win gaming system, according to an example embodiment of the present invention. In the example progressive system, a plurality of VLTs 220 may be connected via a communication data network 230 to a central controller 240 ("Jackpot Controller"). Such network communication may be a wide area network ("WAN") via a modem (analog, ISDN, cable, DSL, etc.), radio link, Ethernet connection, or other hardware or software now known or later developed.

System Communication Between VLTs and Jackpot Controller Preventing Near-Concurrent Wins Some example embodiments of the present invention may prevent concurrent or near-concurrent wins, which might require the venue hosting the progressive game to make multiple payouts at the elevated progressive jackpot amount when only a single payout is required to be made. In such instances when a second progressive jackpot winner is registered shortly after the first progressive jackpot winner, occurring when the second VLT initiates its play during the spin-time of the first winning VLT, the second winner should win the subsequent or reset jackpot. In the past the casino operator had the choice of paying the large jackpot amount twice, or upsetting one of the winning players.

Other potential solutions to this problem in the art have been found to be inadequate. For example, issuing a "block" on other VLTs to prevent a second win of the progressive amount while the first win is being processed does not account for other active VLTs that are in process at the time of the first win. Such a solution still permits multiple near-concurrent "wins", which is a costly burden on the venue as well as dampen player enthusiasm for the game.

Another potential solution is to issue a block on subsequent wins at the time the first win is processed, and extend the block to alternate active VLTs in process at the time the first win is processed. This solution would protect the venue from paying multiple progressive jackpots. However, such an action would create both customer confusion and, potentially, customer anger. Customer confusion may arise because the jackpot amount for which the player is competing would change during the play. Furthermore, a sudden change in the jackpot amount may anger some consumers.

Figure 3:
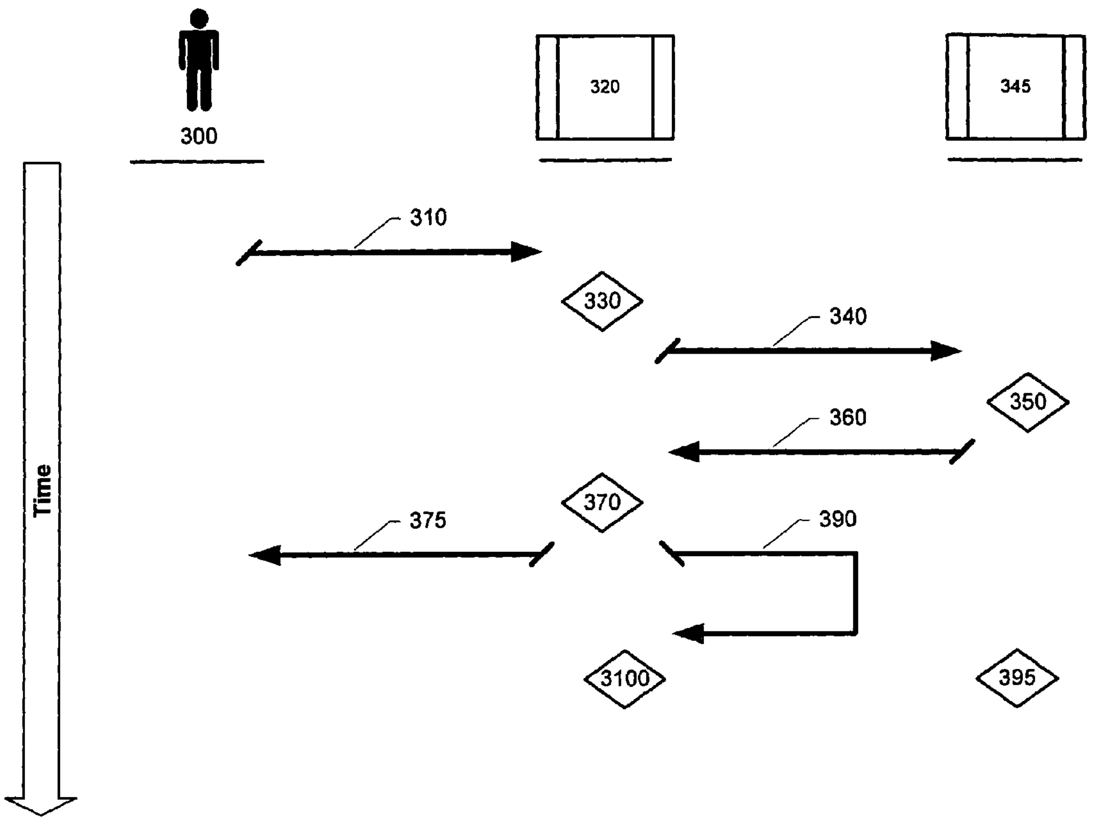
FIG. 3 is a flowchart illustrating example message communications and processing between an individual winning VLT, the Jackpot Controller, and other non-winning VLTs.

Some example embodiments of the present invention solve this problem facing venues employing progressive gaming systems. FIG. 3 is a general flowchart of an example message communications, according to an example embodiment of the present invention. In part, this the example embodiment exploits the two-part interaction between the player and the VLT, first the deposit of credit to initiate the play, and second the execution of the play. The player's 300 deposit of credit 310 with the VLT 320 may establish the outcome 330 of the play and may send a message 340 to the Jackpot Controller 345 prior to the time at which play is executed 390. The Jackpot Controller may determine whether the player wins the progressive jackpot 350 and sends 360 a return message to the VLT. The VLT then executes the play. If the play is a win for the progressive jackpot, the Jackpot Controller may block other VLTs from registering a win for that jackpot amount 350. The execution of the play 390 may either result in the predetermined loss or the predetermined win 3100. Following the award of a win for the progressive jackpot, other VLTs may be released from the block 395.

Alternatively, the VLT may determine whether a player wins the jackpot and may inform the controller of the progressive win.

Figures 1, 4:
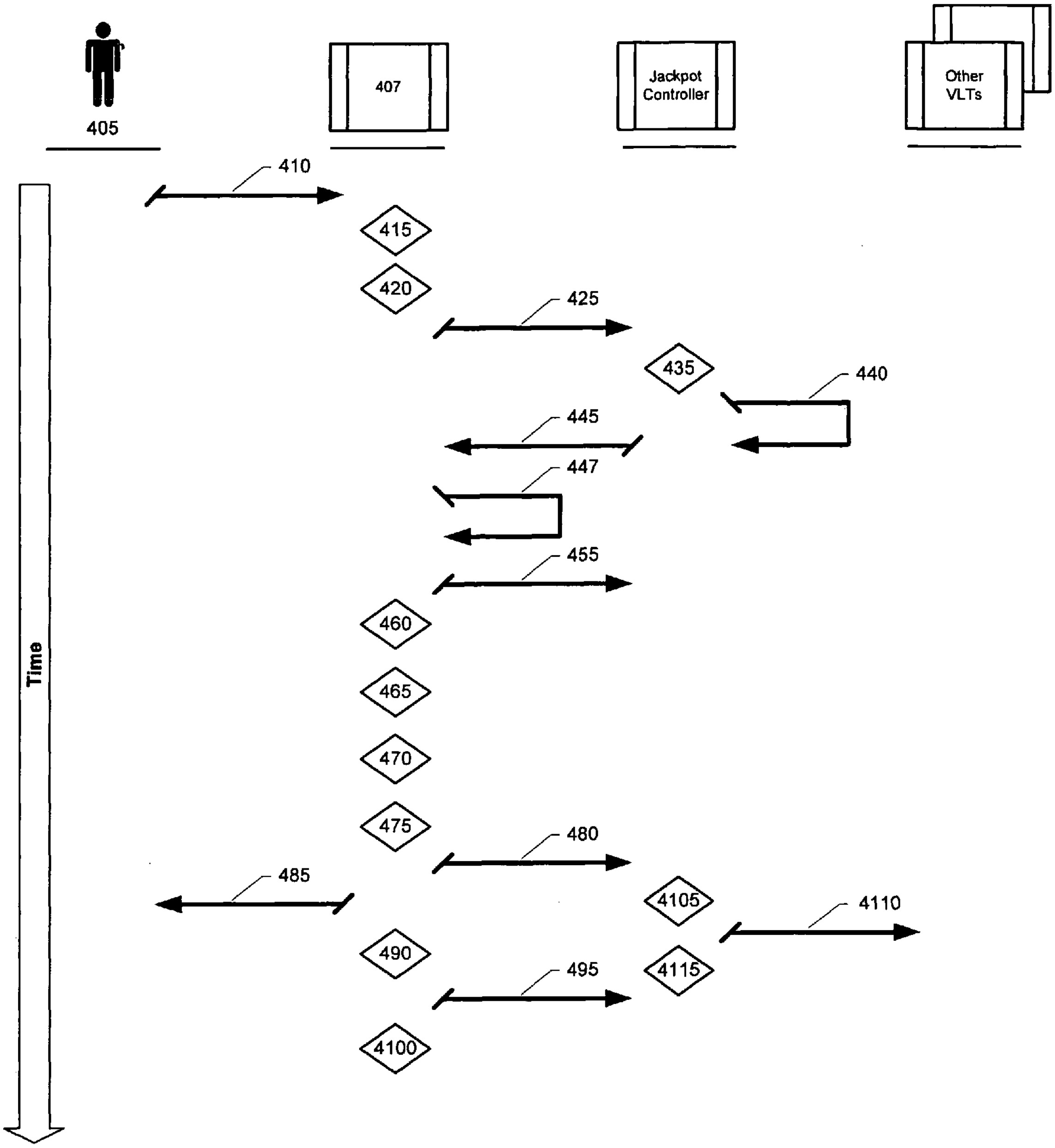
Figures 2, 4:
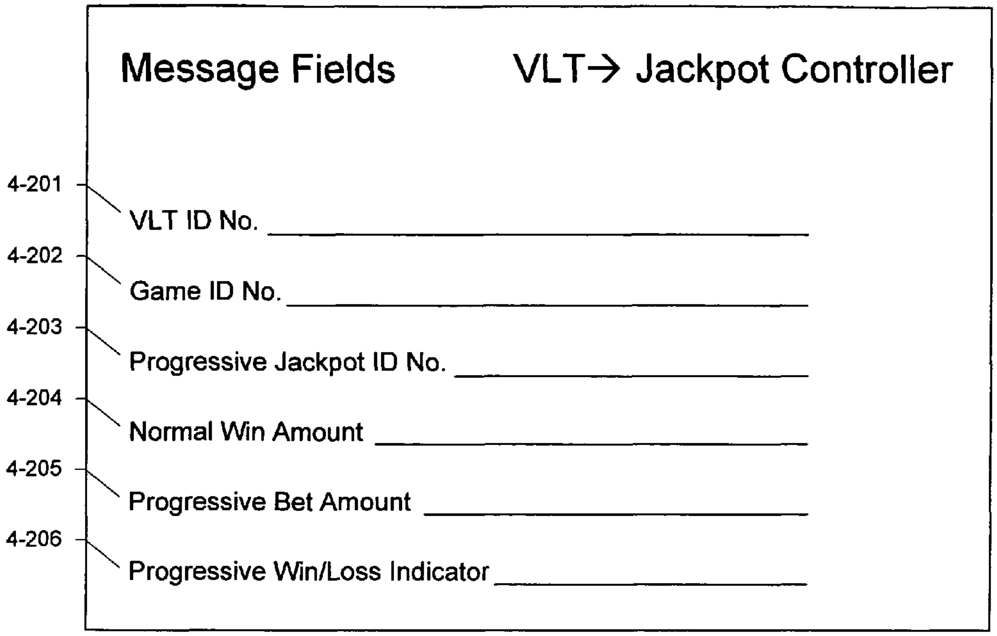
Figures 3, 4:
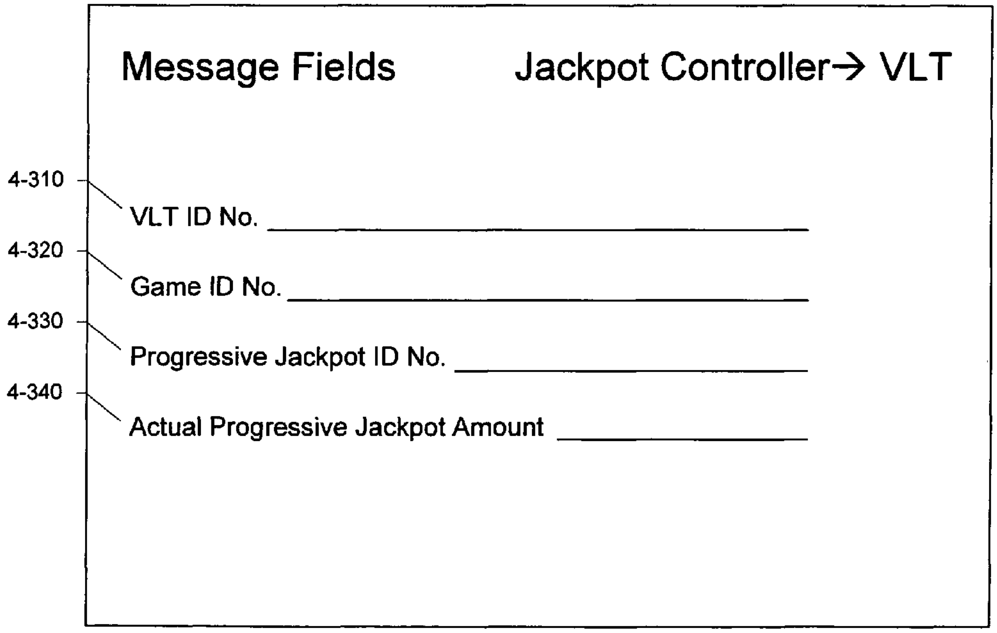
Figure 4:
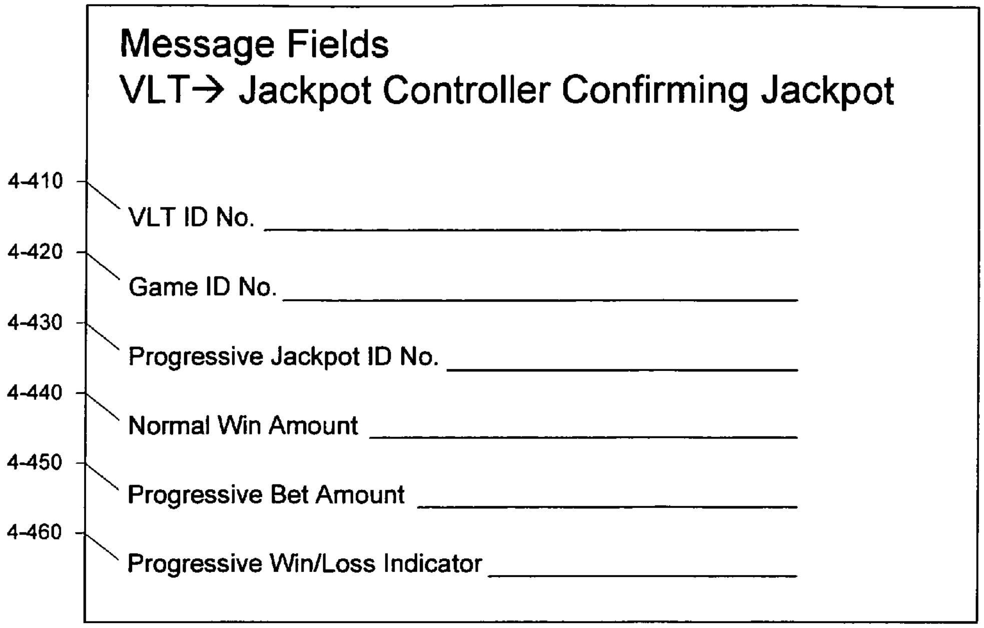

One example embodiment is now described in more detail. Of course, one skilled in the art will recognize that different game vendors or game programmers may use differing approaches; the embodiment is merely exemplary. The disclosed method of blocking subsequently active VLTs from awarding a previously won progressive jackpot can be readily adapted. FIG. 4 is a flowchart illustrating an example interaction between a specific VLT that awards the jackpot, the Jackpot Controller, and other non-awarding VLTS. Communication between a specific VLT and the Jackpot Controller may be initiated by the player 405. The player may commit a credit to play 410, which may be either a single credit or any number of credits up to the limit prescribed by the machine. Upon commitment of the first credit, the VLT may initialize 415 and determine 420 the outcome of the ensuing play (e.g., win or loss, and if a win, the amount). This play information may be sent to the Jackpot Controller thru message 425.

FIG. 4-2, illustrates example message fields of the communication sent from the VLT to the Jackpot Controller upon the VLT's determination that the play will be a "win", according to an example embodiment of the present invention. The message may consist of four fields: the VLT identification number 4-201, the game identification number 4-202, the progressive jackpot identification number 4-203, and the normal win amount 4-204.

Upon receipt of the "win" message from the VLT, the Jackpot Controller may determine 435 whether a "win" is permitted based upon the progressive jackpot identification number 4-203 and Progressive Win/Loss indicator 4-206 provided in the message from the VLT. The VLT may send the normal win amount (non progressive win amount) to the Jackpot Controller for accounting purposes. The total amount being displayed to the player may be as follows: Total Award=Progressive Jackpot Amount+Normal VLT Game Play Win. If the Jackpot Controller has not blocked the win for the submitted progressive jackpot identification number, the Jackpot Controller may then issue a block 440 on all subsequent wins corresponding to that specific progressive jackpot identification number.

Upon issuance of the block, the Jackpot Controller may send 445 a message to the winning VLT to communicate the current actual jackpot amount information. FIG. 4-3 shows example message fields of the message sent from the Jackpot Controller to the VLT, confirming the win of the Progressive Jackpot, according to an example embodiment of the present invention. The message sent may consist of four fields, the VLT identification number 4-310, the game identification number 4-320, the progressive jackpot identification number 4-330, and the actual progressive jackpot amount 4-340. The receipt of this message causes the VLT execute the play 447 and records the player's bet in its logs at this time. See, FIG. 4.

Execution of the play may cause the VLT to send a message 455 back to the controller to confirm that the VLT game has started and the jackpot should be awarded. Illustrated in FIG. 4-4 are the contents of the example message sent from the VLT to the Jackpot Controller to confirm the jackpot amount, according to an example embodiment of the present invention. The confirmation message may consist of four fields: the VLT identification number 4-410, the game identification number 4-420, the progressive jackpot identification number 4-430, and the normal win amount won 4-440, the progressive bet amount by the player 4-450, and the progressive win/loss indicator 4-460.

Execution of the play may also prompt the VLT to begin a series of events to evidence the play to the consumer. After the confirmation message is sent to the Jackpot Controller, the VLT may start play 460, may stop the play 465, and then may display the result 470, previously determined when the player initially committed a credit to play 410. After displaying the result, the VLT may update 475 its internal financial accounting and statistical meters. See, FIG. 4.

Figures 4, 5:
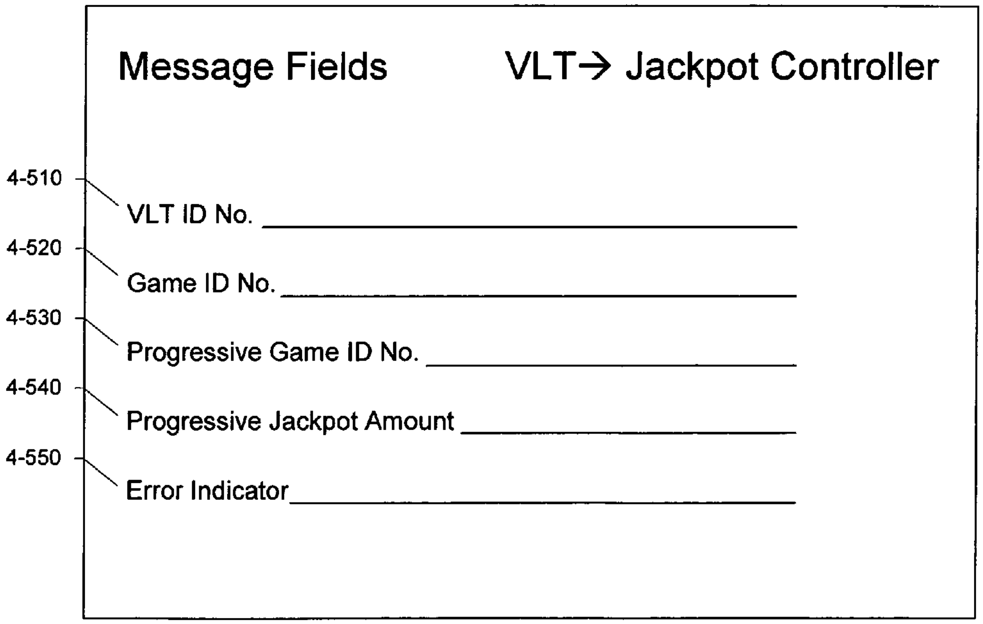
Figure 5:
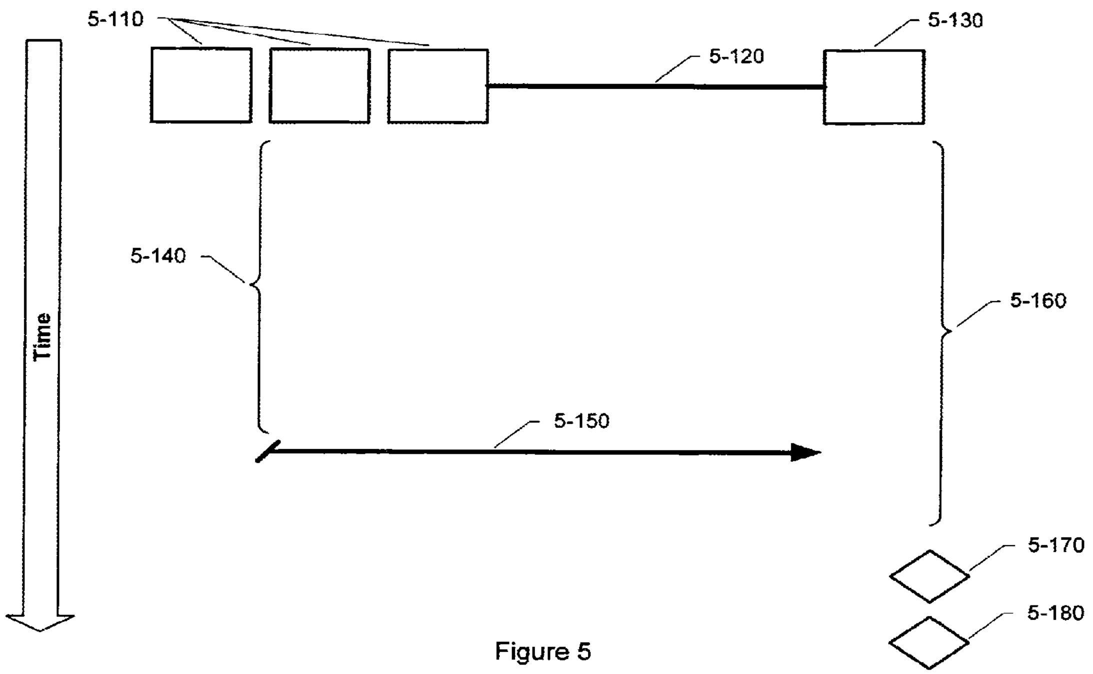

As shown in FIG. 4, the VLT may send a confirmation message 480 to the Jackpot Controller to confirm a win was displayed, and that no malfunction occurred between the time the VLT received the jackpot award amount and the time after the play was executed. FIG. 4-5 illustrates example contents of the message sent from the VLT to the Jackpot Controller to confirm the win execution, according to an example embodiment of the present invention. The message may consist of five fields: the VLT identification number 4-510, the game identification number 4-520, the progressive game identification number 4-530, the progressive jackpot amount 4-540 won, and an indication that no error occurred 4-550, which acts as a prompt to the Jackpot Controller that the progressive jackpot will be dispersed, and that the Jackpot Controller should advertise the win.

After the VLT sends the win confirmation message to the Jackpot Controller, the VLT may proceed to disperse the winnings 485 to the player. Disbursement may be done in alternate methods, including, but not limited to, payout by tokens or other currency at the VLT machine, crediting a players venue play card, or directly by the venue itself. Once the VLT pays the player, the VLT may reset 490 and may send a message 495 to the Jackpot Controller to clear the win advertising message. Alternatively, the message may also time out on the meter after a period of time. In yet another embodiment, the casino operator may have the ability of clearing the meter/sign immediately upon the player receiving payment by the establishment. Once the VLT resets, the VLT is prepared for another play 4100.

Referring to FIG. 4, when the Jackpot Controller receives the VLT win confirmation message 480, the Jackpot Controller may display a progressive win message 4105 on its signage and may send a message to other VLTs 4110 to advertise the win. The Jackpot Controller win advertisement may be displayed 4115 on the signage for a predetermined time or until the winning VLT has been reset, after which the signage may revert to displaying the current progressive jackpot amount.

The above description of the method by which a venue may prevent the occurrence of near-concurrent wins is an example embodiment of the present invention. It will be appreciated that alternate embodiments may be derived from this above embodiments. For example, in an alternate example embodiment of the present invention, the Jackpot Controller may determine the result of all plays as well as track and increment the progressive jackpot.

Jackpot Controller Interruption/Data Recovery

Generally, the Jackpot Controller's main purpose is to calculate, track, and display the progressive jackpot amount associated with the VLT group to which it is connected. A risk associated with using an incrementing jackpot amount is the constantly changing amount when the VLTs are active. Because of this constant incrementation, it may be difficult for the Jackpot Controller to store such information, and should power be interrupted or some other event occurs that interrupts the data stream between the VLTs and the Jackpot Controller, such jackpot information could be lost. This risk may manifest when an interruption event occurs which severs the network connection between the Jackpot Controller and the VLTs, or where the interruption event causes a loss of data stored in the Jackpot Controller.

To alleviate this risk, the Jackpot Controller may send periodic messages to all connected VLTs. This periodic message may be sent at predetermined intervals to update connected VLTs of the current progressive jackpot amount. Upon the occurrence of an interruption event, the Jackpot Controller may initiate a process by which it retrieves the information sent in the periodic message to reestablish the progressive jackpot amount.

Figure 6:
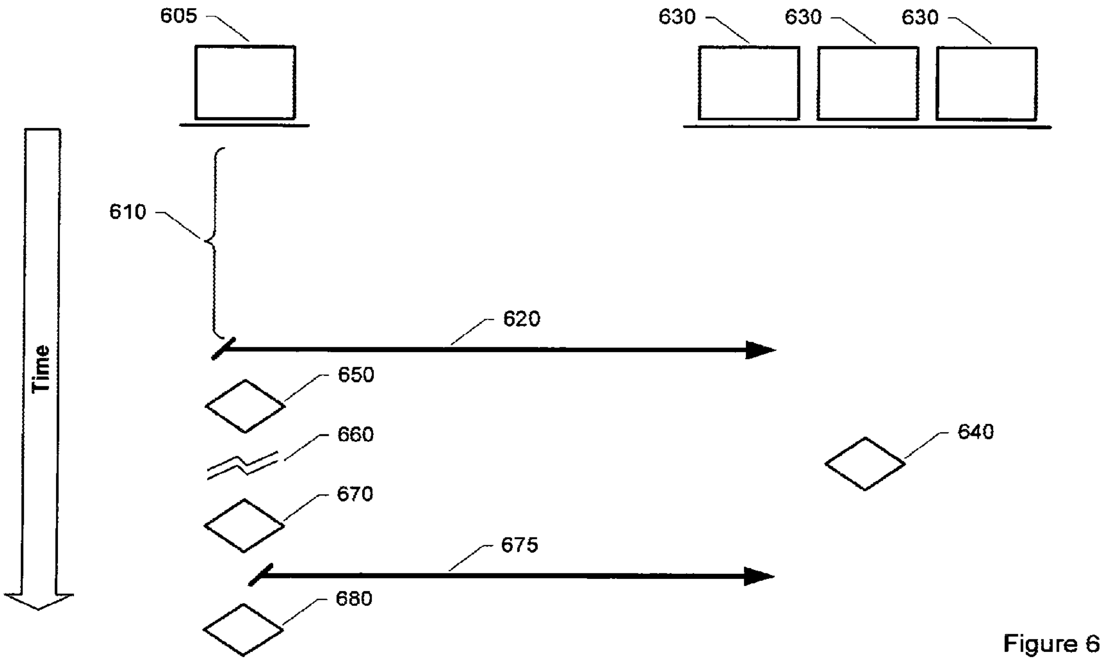
FIG. 6 is a flowchart illustrating the example message communication and resultant course of action between individual VLTs and the Jackpot Controller prior to and after an interruption event that affects the Jackpot Controller progressive jackpot amount data, according to an example embodiment of the present invention.
Figures 1, 6:
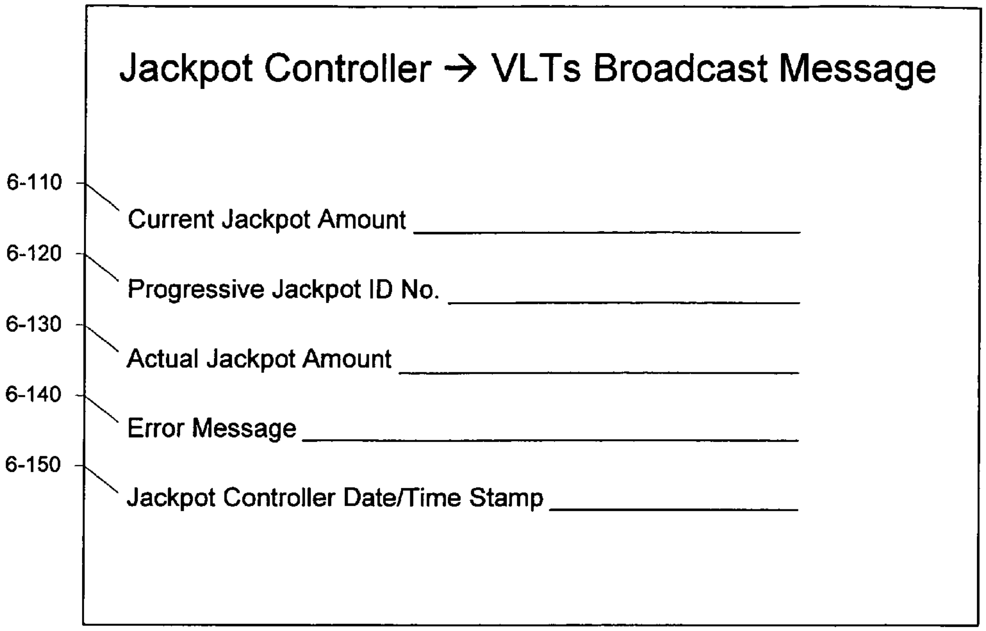

Referring to FIG. 6, a flowchart is shown which illustrates the above described example method to recover the progressive jackpot information following a catastrophic event which would require the replacement of the Jackpot Controller. After a predetermined time 610, the Jackpot Controller may send a broadcast message 620 to all VLTs 630 connected to the network. Connected VLTs may receive the message and store 640 the information. Once this message is sent, the Jackpot Controller may broadcast message timer 650 is reset and begins another countdown to the predetermined time at which the broadcast is repeated.

Should a catastrophic event occur 660, the Jackpot Controller may shift to recovery mode 670 and may initiate a recovery process 680 to determine the appropriate progressive jackpot amount. The Jackpot Controller may contact each VLT it is/was communicating with 675 to request what the VLT has stored as the last jackpot amount 640. The Jackpot Controller then may determine 680 the most recent jackpot amount and prompts the user to accept or reject the jackpot amount for the restored jackpot.

FIG. 6-1 shows example message fields of an example broadcast message sent by the Jackpot Controller, according to an example embodiment of the present invention. These information fields may include the current jackpot amount to be displayed 6-110, the progressive jackpot identification number 6-120, the actual jackpot amount 6-130, an error message 6-140 to be displayed on the VLT display should there be some error associated with the VLT, and a Jackpot Controller date/time stamp 6-150. Of course, it may be appreciated that these are not the only fields that may be required in the communication between the Jackpot Controller and the VLT. Other fields may also be used.

In an alternate example embodiment, the Jackpot Controller may send periodic messages to individual VLTs by cycling through the list of VLT identification numbers associated with the Jackpot Controller. At each periodic instance, a single message may be sent to a single VLT controller containing the information in FIG. 6-1, with the addition of a field to identify the VLT controller to which the message is sent. Upon the occurrence of an interruption event, the Jackpot Controller, during its recovery process, may cycle through each VLT response communication to determine the current progressive jackpot amount.

In an alternate example embodiment, the periodic broadcast communication may be incorporated with a status request message sent from the Jackpot Controller to each individual VLT to ensure the VLT is online and connected to the network. This alternate example embodiment that incorporates both processes would reverse the flow of message communications to determine the online status of individual VLTs.

Monitoring VLT Online Status

Another feature of some example embodiments is monitoring a VLT's operational status through the use of "heartbeat" or "keep-alive" messages sent from a VLT to the Jackpot Controller. While the concept of such messages are well known in the art, they have not been applied to progressive gaming systems.

Implementation of a progressive gaming system may need a constant data connection between the Jackpot Controller and the individual VLTs. While a VLT is in use by a player the VLT is in communication with the Jackpot Controller, and a sudden interruption in the connection may almost be immediately identified by the Jackpot Controller. However, where a VLT has been inactive, it is necessary to ensure that the existing data connection is still functioning. Should an interruption in the data connection occur, the VLT may lose its connection with the Jackpot Controller. In such an instance, the VLT could not award the progressive jackpot, but this malfunction would not be directly reflected to a player.

To alert a player to the malfunction, and initiate a process to correct the malfunction, an inactive VLT will send to the Jackpot Controller a status message at predetermined periodic intervals. The Jackpot Controller monitors these status messages from each individual VLT, and should an individual VLT not submit a status message within a predetermined time, the Jackpot Controller initiates a process whereby the VLT is disconnected from the network and the error instance is logged.

An example embodiment of the online status according to the present invention is shown in FIG. 5. A plurality of VLTs 5-110 may be connected to a network 5-120, as is the Jackpot Controller 5-130. If a VLT experiences no activity for a predetermined time 5-140, the VLT sends a status message 5-150 to the Jackpot Controller. During operations, the Jackpot Controller maintains timers for each VLT that is connected to its system. Where the Jackpot Controller does not receive a status message from a VLT within the VLT's assigned predetermined time 5-160, the Jackpot Controller initiates a process to notify the venue of the disabled VLT's status. The Jackpot Controller disconnects the VLT from the progressive gaming system 5-170 and generates a log 5-180 of the error.

An alternate example embodiment may reverse the monitoring action, whereby the Jackpot Controller pings each individual VLT. Each VLT may be configured to time out and disconnect itself from the progressive gaming network should it not receive a ping within a predetermined time period.

In another example embodiment, the Jackpot Controller's ping monitoring may be combined with sending jackpot amount information used for information recovery.

The foregoing description addresses example embodiments encompassing the principles of the present invention. The embodiments may be changed, modified and/or implemented using various types of arrangements. It will be appreciated that various modifications and changes may be made to the invention without strictly following the exemplary embodiments and applications illustrated and described herein, and without departing from the scope of the invention, which is set forth in the following claims.

The invention claimed is:

1. A method for preventing near-concurrent wins in a progressive gaming system played on a network comprising a centralized controller and plurality of game terminals, comprising:

determining, on a game terminal, the outcome of a future play upon deposit of a credit to play a game by a player;

determining at the game terminal whether the outcome is a progressive game win;

responsive to the outcome being determined to be a progressive game win at the game terminal and prior to onscreen presentation of the play initiated by the player, communicating the outcome to a centralized controller;

determining, at the centralized controller, whether the outcome will award a particular progressive jackpot amount;

responsive to the outcome being determined to be a particular progressive jackpot amount at the centralized controller, issuing a block to prevent other wins of the particular progressive jackpot amount at the other terminals in the plurality of game terminals and communicating the particular progressive jackpot amount to the terminal; and responsive to receipt of the progressive jackpot amount communication at the terminal, beginning onscreen presentation of the play initiated by the player.

2. The method from claim 1, further comprising:

advertising the award of the progressive jackpot on a display.

3. The method from claim 1, further comprising:

periodically broadcasting a message across the network, the message containing status information regarding the incrementing progressive jackpot amount.

4. The method from claim 3, further comprising:

recovering at the centralized controller progressive jackpot information upon the occurrence of an interruption event.

5. The method from claim 1, further comprising:

periodically sending individual messages from individual machines to the centralized controller after an individual machine is inactive for a predetermined period.

6. The method from claim 5, further comprising:

responsive to the centralized controller not receiving a status message, disconnecting a malfunctioning machine from the network.

7. The method from claim 1, wherein the communicating to the centralized controller occurs after the deposit of credit at the machine but before the game is played.

8. The method of claim 1, further comprising:

recovering progressive jackpot information by the centralized controller upon the occurrence of an interruption event.

9. The method of claim 1, further comprising:

sending messages sent from individual machines to the centralized controller after an individual machine is inactive for a first predetermined period.

10. The method of claim 9, further comprising:

disconnect a malfunctioning machine from the network should the centralized controller not receive a status message during a second predetermined period.

11. A method for preventing near-concurrent wins in a progressive gaming system having a plurality of game terminals, comprising:

determining at a terminal the outcome of a future play when credits are registered at the terminal;

communicating the outcome to a centralized controller before play of the game is initiated at the terminal by the player;

determining whether the outcome will result in the award of a particular progressive jackpot amount;

responsive to the outcome being determined to be a particular progressive jackpot amount, issuing a block to prevent other wins of the particular progressive jackpot amount at other game terminals in the plurality of terminals; and in response to the communicated outcome and before onscreen play of the game is initiated at the terminal, sending a communication from the centralized controller to the terminal awarding the jackpot amount.

12. A method for preventing near-concurrent wins in a progressive gaming system and for maintaining the operability of the progressive gaming system having a plurality of game terminals, comprising:

sending individual status messages from a centralized controller to each of the plurality of game terminals when the individual machines have been inactive for a predetermined period of time;

upon receipt of a credit by a player at one of the individual machines, determining the outcome of the play at the one of the individual machines;

communicating the outcome from the one of individual machines to a centralized controller;

determining whether the outcome will award a particular progressive jackpot amount;

responsive to the outcome being determined to be a particular progressive jackpot amount, issuing a block to prevent other wins of the particular progressive jackpot amount at other game terminals of the plurality of game terminals;

awarding the progressive jackpot amount in response to the communicated outcome; and receiving at the one of the individual machines a communication from the centralized controller indicating the progressive jackpot award amount in response to the communicated outcome before onscreen play of the game is initiated at the one of the machines.

13. The method of claim 12, further comprising:

if the centralized controller does not receive a status message from a game terminal during a predetermined interval, disconnecting the machine from the network.

14. The method of claim 12, further comprising:

periodically broadcasting status information regarding the progressive jackpot award amount; and storing the broadcast amount at an individual game terminal.

15. The method of claim 14, further comprising:
recovering progressive jackpot information from the individual game terminal after occurrence of an interruption event.

16. A system for progressive gaming, comprising:
a plurality of game terminals configured to determine outcomes for plays upon receipt of a play credit, the outcomes including outcomes for a progressive jackpot game, the plurality of game terminals including
a first game terminal in the plurality of game terminals, the first game terminal configured to determine a first outcome of a first play and to display a first play result to a first player;
a second game terminal in the plurality of game terminals, the second game terminal configured to determine a second outcome of a second play and to display a second play result to a second player;
a jackpot controller in communication with the plurality of game terminals;
a progressive jackpot, the progressive jackpot receiving a portion of wagers from player-initiated plays made at the plurality of game terminals;
a first game terminal outcome message received by the jackpot controller and communicating that the first outcome will be a progressive jackpot winning outcome;
a second game terminal outcome message received by the jackpot controller and communicating that the second outcome will be a progressive jackpot winning outcome;
a first jackpot message sent by the jackpot controller in response to the first game terminal outcome message and received by the first terminal prior to the display of the first play result and communicating a first awarded jackpot amount; and
a second jackpot message sent by the jackpot controller in response to the second game terminal outcome message and received by the second terminal prior to the display of the second play result and communicating a second awarded jackpot amount,
wherein, when the first play result is a progressive jackpot winning outcome, the first game terminal is configured to display the first play only after receiving the first jackpot message, and wherein when the second play result is a progressive jackpot winning outcome, the second game terminal is configured to display the second play only after receiving the second jackpot message.

17. The system of claim 16, wherein, when the first jackpot message is received before the second jackpot message but close in time, the jackpot controller is configured to award the full progressive jackpot in the first jackpot message and to award a re-seeded progressive jackpot in the second message.

18. The system of claim 16, wherein, when the first jackpot message is received before the second jackpot message but close in time, and the second jackpot message has an earlier timestamp than the first jackpot message, the jackpot controller is configured to award the full progressive jackpot in the second jackpot message and to award a re-seeded jackpot in the first jackpot message.

19. The system of claim 16, wherein the plurality of game terminals are configured to lock and not begin play if a jackpot message is not received in response to a jackpot winning message before the expiration of a timeout period.

20. A method for preventing near-concurrent wins in a progressive gaming system comprising:
upon receipt of a credit, determining the outcome of a subsequent play at a game terminal, the outcome including a result for a progressive jackpot game;
conditioned on the outcome being a progressive game win, communicating the outcome to a centralized controller;
awarding a current progressive jackpot amount to the communicated result; and
whenever the outcome is a progressive game win, waiting for a positive acknowledgment from the centralized controller before displaying the game play to the player at the game terminal.

21. The method of claim 20, further comprising:
locking the game terminal if the positive acknowledgement from the centralized controller is not received before the expiration of a timeout interval.

22. The method of claim 21, further comprising:
registering player credit for the play of the game;
in response to locking the game terminal, releasing the player credit.

* * * * *